US006964244B2

(12) United States Patent
Stockton

(10) Patent No.: US 6,964,244 B2
(45) Date of Patent: Nov. 15, 2005

(54) TACTILE IDENTIFICATION AND DIRECTION GUIDANCE SYSTEM AND METHOD

(76) Inventor: Kevin M. Stockton, 868 Little Valley Rd., Roseburg, OR (US) 97470

( * ) Notice: Subject to any disclaimer, the term of this patent is extended or adjusted under 35 U.S.C. 154(b) by 0 days.

(21) Appl. No.: 10/225,952

(22) Filed: Aug. 22, 2002

(65) Prior Publication Data

US 2003/0037720 A1 Feb. 27, 2003

Related U.S. Application Data

(60) Provisional application No. 60/314,606, filed on Aug. 23, 2001.

(51) Int. Cl.[7] .................... G09B 21/00
(52) U.S. Cl. .................... 116/205; 116/DIG. 17
(58) Field of Search .................... 116/205, DIG. 17; 404/6, 9, 12, 13, 15

(56) References Cited

U.S. PATENT DOCUMENTS 1,686,363 A * 10/1928 Baldwin .................... 40/565
4,080,087 A * 3/1978 Phillips .................... 404/72
4,385,586 A * 5/1983 Schriever .................... 116/205
4,620,816 A * 11/1986 Kupfer .................... 404/6
4,715,743 A 12/1987 Schmanski .................... 404/9
4,998,391 A * 3/1991 Connew .................... 52/179
5,303,669 A 4/1994 Szekely .................... 116/205
5,626,094 A * 5/1997 Jeffery et al. .................... 116/205
5,775,016 A * 7/1998 Chien .................... 40/544
5,904,017 A * 5/1999 Glatz et al. .................... 52/287.1
5,917,326 A * 6/1999 Gonzalez et al. .................... 324/326
6,025,773 A * 2/2000 Bresnan .................... 340/407.1
6,237,266 B1 * 5/2001 Tassey et al. .................... 40/542
6,499,910 B1 * 12/2002 Grahmbeek et al. .................... 404/75

FOREIGN PATENT DOCUMENTS

FR 2456513 A * 1/1981 .................... A61F/9/08
JP 05161680 A * 6/1993 .................... A61H/3/06
JP 11231819 A * 8/1999 .................... G09F/19/22
JP 2003064627 A * 3/2003 .................... E01F/9/04

* cited by examiner

*Primary Examiner*—R Alexander Smith
(74) *Attorney, Agent, or Firm*—Olson & Olson

(57) ABSTRACT

A tactile identification and direction guidance system and method for blind and otherwise visually impaired persons provides a plurality of substantially identical, longitudinally elongated marker members for support on an underlying walkway in laterally spaced apart, substantially parallel groups having different predetermined numbers of laterally spaced marker members forming different predetermined patterns each identifying and designating a different type of obstacle encountered by the visually impaired person, the person's proper movement required relative to the obstacle being indicated and directed by the positioning of the elongated dimension of the laterally spaced, substantially parallel extending marker members on a predetermined, line of travel orientation relative to the obstacle for proper movement of a person thereby.

10 Claims, 5 Drawing Sheets

TACTILE IDENTIFICATION AND DIRECTION GUIDANCE SYSTEM AND METHOD

This application claims benefit under 35 U.S.C. 119(e) of earlier filed U.S. Provisional application Ser. No. 60/314,606, filed Aug. 23, 2001.

BACKGROUND OF THE INVENTION

This invention relates to systems and methods for warning and guiding blind and otherwise visually impaired pedestrians relative to crosswalks and other obstacles encountered on public and private sidewalks and walkways, and more particularly to a system and method which also specifically identifies which particular type of obstacle of a plurality of different types of obstacles has been encountered, such as, for example, identifying and distinguishing between crosswalks; bus, taxi and mass transit loading areas; building entrances; stairs, steps, elevators and escalators; and other situations of concern to the visually impaired pedestrian.

The import of this invention is to provide a tactile directional guidance system and method which may be established as a universally accepted and regulated standard marking system that meets both the needs and requirements of the visually impaired as well as all various federal, state and municipal codes, regulations and policies governing public and private walkways, etc. In one preferred form, the system of this invention utilizes a single, elongated marker bar or strip member provided in various selected, laterally spaced apart numbers to form one of a number of various different ground-mounted grid patterns each selected and arranged to designate a different, specific type of hazard or obstacle and direct a visually impaired person's movement properly relative thereto.

Numerous tactile warning and directional systems have been proposed heretofore but have been found to be less than satisfactory or unacceptable for a variety of reasons. U.S. Pat. No. 4,715,743 to Schmanski for example teaches a plurality of square tiles having a plurality of bumps or truncated domes provided on their top surface, the tiles arranged for positioning along a curb or other hazardous edge to give warning to a blind or otherwise visually impaired person of the impending curb edges, etc. The reference also teaches in combination with the aforementioned warning tiles, the provision of additional tiles having a plurality of elongated bar-like members for indicating direction of travel to a third, guide track component of the system combination for guided travel through a crosswalk as well. The visually impaired pedestrian therefore is warned of his encountering a curb or crosswalk situation, and is given direction relative thereto. Therefore this reference teaching is only usable in connection with one single type of situation, as for example a crosswalk situation, leaving all other types of situations encountered by visually impaired pedestrians unserved and unidentified. Clearly, the provision of an identical tile combination arrangement at other types of situations could only be confusing and potentially dangerous for the pedestrian who would not be informed by the system of the patent reference as to what particular obstacle he has just encountered. U.S. Pat. No. 5,303,669 to Scekely also primarily discloses a warning system comprising tiles having a plurality of raised bumps to notify a visually impaired pedestrian that he is approaching a curb edge or other drop off edge. However in the disclosure of the patent, suggestion is made in FIGS. 21–23 that tiles may be provided with elongated strips for orientation relative to a crosswalk in order to provide orientation for a visually impaired pedestrian relative to the encountered crosswalk. Again, this reference merely provides warning and in one single embodiment provides orientation for a pedestrian at the single, given situation of a crosswalk.

In this regard, no system has been provided heretofore which permits the individual identification of each of a plurality of various different types of situations being encountered and instead provides only for warning and guidance. However, absent an easily identifiable recognition of what the particular situation being encountered is, a visually impaired person is still left to then determine whether a warning he has just detected is for a crosswalk intersection, or some other hazard or obstacle such as a stairway or a bus stop. It can therefore be seen that if guidance systems don't provide immediate and easy identification of the particular situation or hazard being encountered, there is an increased potential for danger to a pedestrian who mistakes a bus stop for a crosswalk intersection, for example.

SUMMARY OF THE INVENTION

In its basic concept this invention provides a tactile marking system and method which is easily detected by a visually impaired person and by which, with the conventional sweep of a cane, blind and other visually impaired persons can immediately identify the particular type of situation or obstacle encountered and quickly become oriented properly for his proceeding relative thereto.

It is by virtue of the foregoing basic concept that the principal objective of this invention is achieved; namely, the provision of a tactile marking system and method which overcomes the limitations and disadvantages of systems and methods of the prior art.

Another important object of this invention is the provision of a tactile marking system and method of the class described which is also extremely cost effective in manufacture and installation so that the system can be provided for the public good by both large and small cities as well as by private businesses and organizations at a minimum expense.

Another object of this invention is the provision of a tactile marking system and method of the class described which may utilize a single, identically-manufactured marker member for application to underlying support surfaces in different selected numbers forming a common, predetermined grid pattern area for designating each selected one of a plurality of different pedestrian situations utilizing only one manufactured member applied in selected multiples, for simplicity in identification of each of a plurality of different designated situations by a blind or visually impaired pedestrian.

A further object of this invention is the provision of a tactile marking system and method of the class described which is configured for mounting on a sidewalk or street surface in compliance with the codes and regulations governing the application of street markings to Federal, state and local streets and sidewalks.

The foregoing and other objects and advantages of the present invention will appear from the following detailed description, taken in connection with the accompanying drawings of preferred embodiments.

DESCRIPTION OF THE PREFERRED EMBODIMENTS

Figure 7:
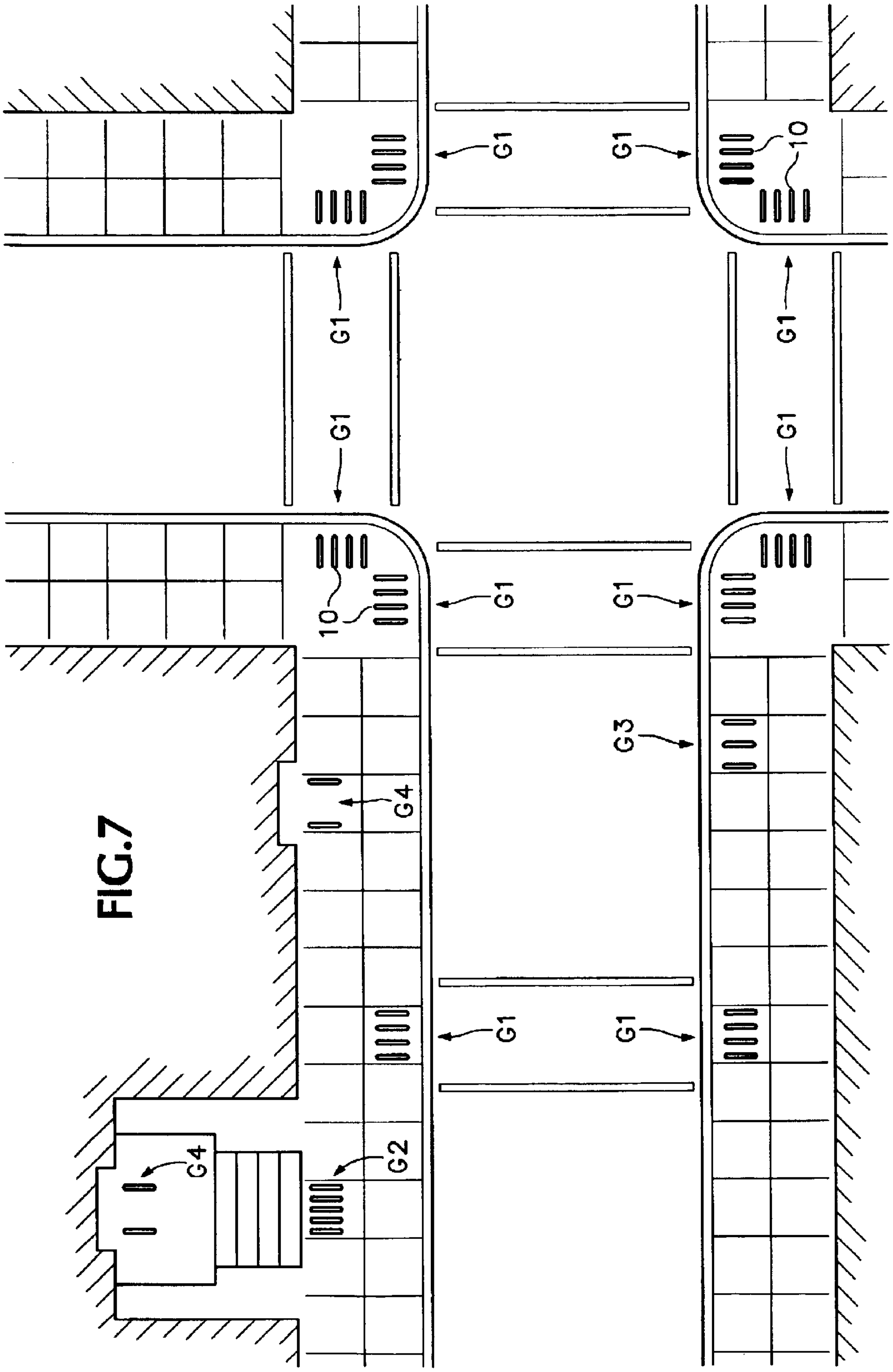
FIG. 7 is a fragmentary schematic plan view of a portion of a city block showing the marking system of this invention with various different grid arrangements at different locations designating various different obstacles encountered by visually impaired pedestrians.

Reference is first made to FIGS. 1–7 of the drawings wherein a first embodiment of the guidance system of this invention is shown, FIG. 7 illustrating the system in place on sidewalk areas along a city street; the guidance system serving to designate and identify various different situations such as crosswalks, stairs, doorway entrances and a bus stop. As can be seen, the particular type of situation is designated by the number of laterally spaced apart, substantially parallel elongated marker members 10 that are provided in each different grid or pattern set. For purpose of illustration in the present disclosure, it will be seen that stairways are designated herein by a group of five laterally spaced apart marker members 10 contained within a predetermined overall lateral grid dimension; crosswalks are designated by a group of four spaced apart marker members 10 arranged with the same predetermined overall grid width as the aforementioned five marker arrangement; bus stops and other transit loading areas are designated by a group of three spaced market members 10 also having the same predetermined overall grid width as described before; and doorway entrances are identified by a group of two widely spaced marker members 10 also having that same predetermined overall grid width as the other arrangements. The reason for this preferred aspect of the guidance system will become clear later. The length of the overall grid patterns are also equal, defined by the length of the longitudinally elongated marker members 10 as can be seen.

Figure 1:
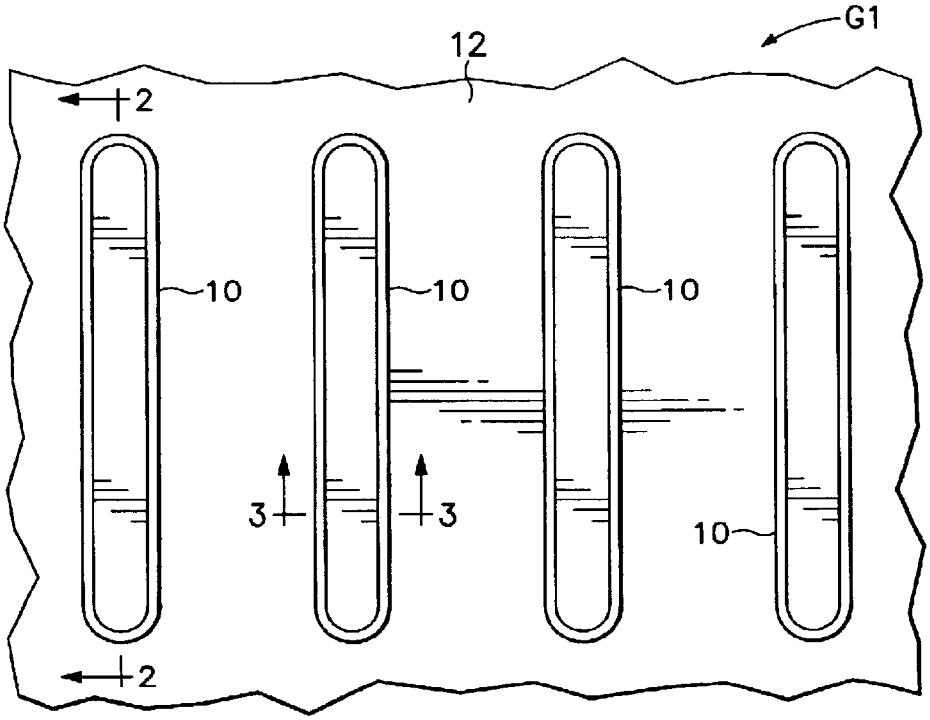
FIG. 1 is a schematic plan view of one grid pattern of the tactile directional guidance system of this invention utilizing four identical, regularly spaced apart elongated marker members to designate, for purposes of the present disclosure, a crosswalk.

With the foregoing basic understanding of the guidance system of this invention and how it may be used in pedestrian areas, attention will now be directed to FIGS. 1–3 of the drawings wherein the elements of the first embodiment of the system will now be described in detail. As can be seen in FIG. 1, the tactile guidance system of this invention utilizes a plurality (four in this grid pattern) of longitudinally elongated marker members 10 extending substantially parallel to each other and preferably positioned in regularly spaced apart condition laterally, together forming a rectalinear grid pattern having a predetermined width and length, the length being defined by the length of the marker members 10.

The U.S. Advisory Committee on pedestrian right-of-way and the U.S. Accessibilities Board has recommended that the minimum dimensions for tactile warning, way-finding and directional devices to be considered "detectable" by a blind or otherwise visually impaired pedestrian is a minimum of 24 inches by 24 inches. Accordingly, in its preferred form the elongated marker members 10 are configured to be at least 24 inches in length, and the width of a preferred grid formed by a plurality of spaced marker members will be equal to or greater than 24 inches. In the embodiments shown herein, the width of the grids is illustrated as being approximately 36". Therefore, it is to be understood that in the illustrative grid patterns shown in FIGS. 1 and 4–6, each of the grid patterns is approximately 24 inches long by 36 inches wide so as to comply with the recommendations set by the U.S. Accessibilities Board for assuring that a tactile marker device is positively detectable by the normal sweep of a cane. It is to be understood, however, that the grid pattern width is not bound to any requirement and may be wider or narrower than the above recommendations if desired, and may also vary in width according to the number of laterally spaced marker members that are contained in each various grid pattern, if desired.

Again, with reference to the individual, identical marker members 10 which are provided in various numbers to form different, selected grid patterns, a preferred marker member is formed as a strip of material approximately 24 inches in length and 3½ inches in width, although the width of the marker member may be narrower or wider, if desired. While many different materials may be used to form the marker members, such as rubber, vinyl, polyurethane and other compositions, it has been determined that a preferred material is an ABS plastic, such as one identified as Centrex Capped ABS because it has been approved by all highway agencies as an acceptable highway marking material and has a long history of superior durability against wear, ultraviolet light exposure and to temperature extremes, as well as the effects of rain, snow, ice and other environmental conditions. If desired, the material may also be colored, such as yellow or red, so that the grids and individual marker members may be discerned by vision-impaired pedestrians capable of limited sight or color perception.

Figure 2:
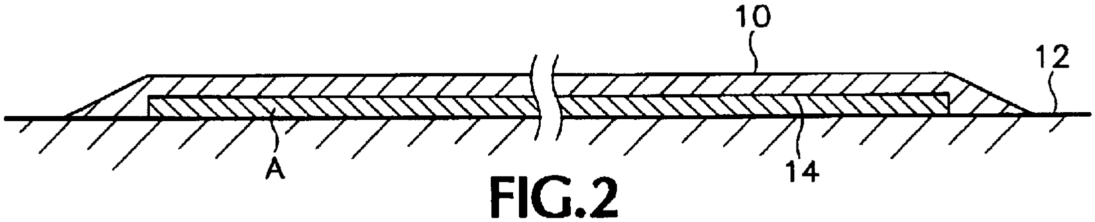
FIG. 2 is a foreshortened longitudinal sectional view of the system of FIG. 1 taken along the line 2—2 in FIG. 1.
Figure 3:
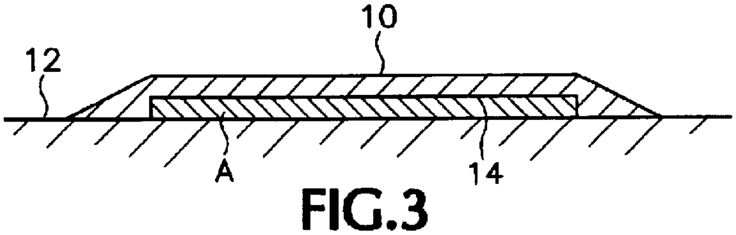
FIG. 3 is a sectional view taken along the line 3—3 in FIG. 1.
Figure 4:
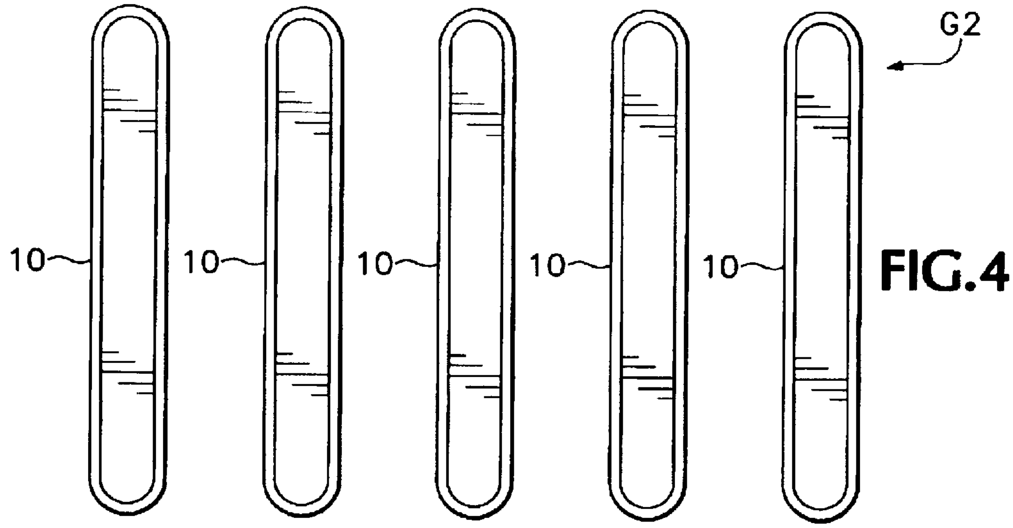
FIGS. 4–6 are schematic plan views similar to FIG. 1 but on a reduced scale and showing various grid patterns of the guidance system of this invention formed by different numbers of spaced-apart, elongated marker members to identify and designate various different obstacles to a visually impaired pedestrian.
Figure 5:
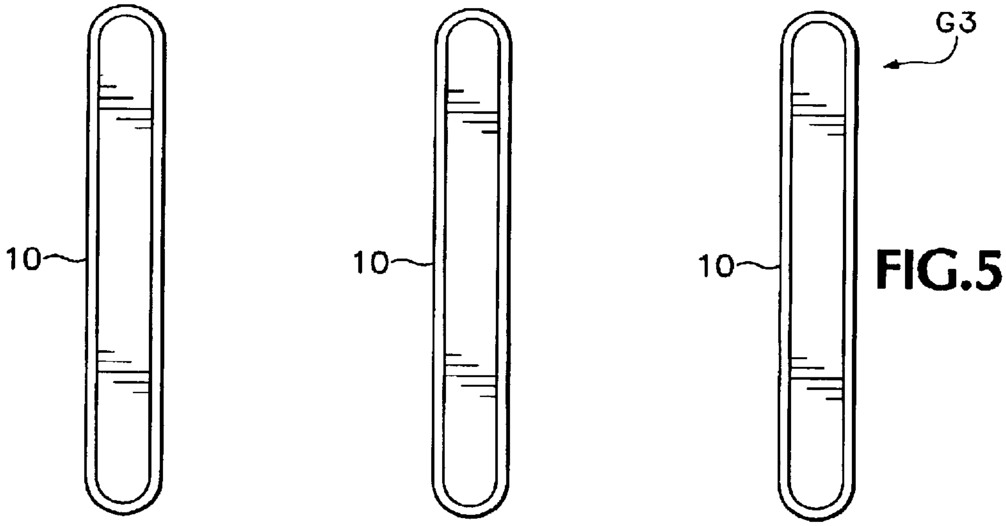
Figure 6:
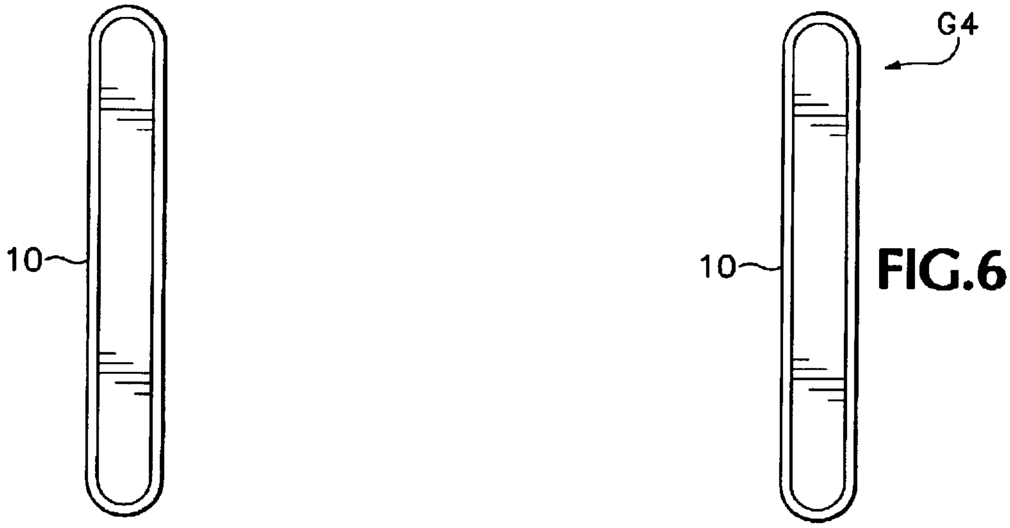

As seen best in FIGS. 2 and 3 of the drawings, the marker member 10 is configured with a thickness that preferably is not greater than approximately ¼ inch and, further, the upper side surface of the marker member is configured with a gently beveled or tapered, peripheral feathered or chamfered edge arranged so that when the marker member is affixed to an underlying walking support surface 12, such as a hard sidewalk surface, building floor, walkway, etc., there is no blunted or raised, projecting edge surface capable of possibly catching a person's shoe or cane or crutch. For ease of illustration throughout, a flat top marker with a peripheral chamfered edge is shown in the various drawings. However a preferred configuration may be a domed or rounded top marker with a beveled or curved peripheral edge for ease of wheelchair passage thereover. A maximum ¼ inch thickness of the marker member is preferred because the U.S. Accessibilities Board has determined that objects projecting more than ¼ inch above a walk surface are regarded as trip hazards.

With specific reference to FIG. 3 of the drawings, it can be seen that, in its preferred form the marker member 10 of this invention may, if desired, be further configured with a bottom side surface having an inwardly recessed pocket portion 14 provided inwardly of the outer peripheral edge of the marker member so as to form a pocket for receiving a selected volume of mounting adhesive A necessary to positively secure the marker member to an underlying support surface, with the outermost peripheral edge of the marker member seated substantially flush and in direct contact with the underlying support surface so that the tapered upper peripheral edge surface will effectively "feather" directly to the underlying support surface. This forms a substantially water-resistant seal with the surface preventing water from entering underneath the member and ultimately freezing in cold weather, possibly separating the member from the underlying surface. It has been determined that the preferred method of mounting the marker member is with epoxy adhesives such as that identified as EAS-6 epoxy adhesive which has been approved and used by the U.S. Department of Transportation to install traffic safety markers on highways, etc. Other means of mounting the marker members 10 onto an underlying ground surface, such as by bolts, screws, rivets, etc., may of course be used if desired or required for a particular application.

To further facilitate the proper and consistent installation of the various grid patterns, templates (not shown) formed of rubber or other suitable material may be provided to the installer and configured, (as for example with predetermined cutout portions), to position the individual marker bar members of a grid pattern properly and precisely in predetermined aligned, spaced apart condition for mounting onto the underlying support surface according to the particular grid pattern being installed. In this manner, strict consistency in uniformity of overall grid dimensions and relative marker positioning and spacing is assured for every grid pattern installed. Additionally, by eliminating any need for the manual positioning of individual marker members according to installer's own measurements, etc., the installation time, labor and potential for inadvertent error on the installer's part is reduced to an absolute minimum.

As will be apparent to those skilled in the art, the individual marker members of this invention may be provided in other forms as that described in connection with the preferred embodiment, as for example, individual marker members may be formed as pre-cast concrete or mortar members for partially embedded placement as desired onto the surface of a freshly laid concrete sidewalk. When the concrete material sets up, the marker members become substantially an integral permanent raised element of the sidewalk surface.

Also, marker members may if desired be formed on an existing walk support surface by pouring or by building up suitable resins and other materials directly onto the walk surface. In such a case, selected templates may be provided having different marker pattern forms as may be desired to act as a temporary mold for the pouring or building up of the material until it has hardened in place on the walk surface, as is a known technique in the street marking art. These and many other methods of providing the raised marker members fixedly on the surface of an underlying walk support may be used satisfactorily in the system of the present invention.

Figure 8:
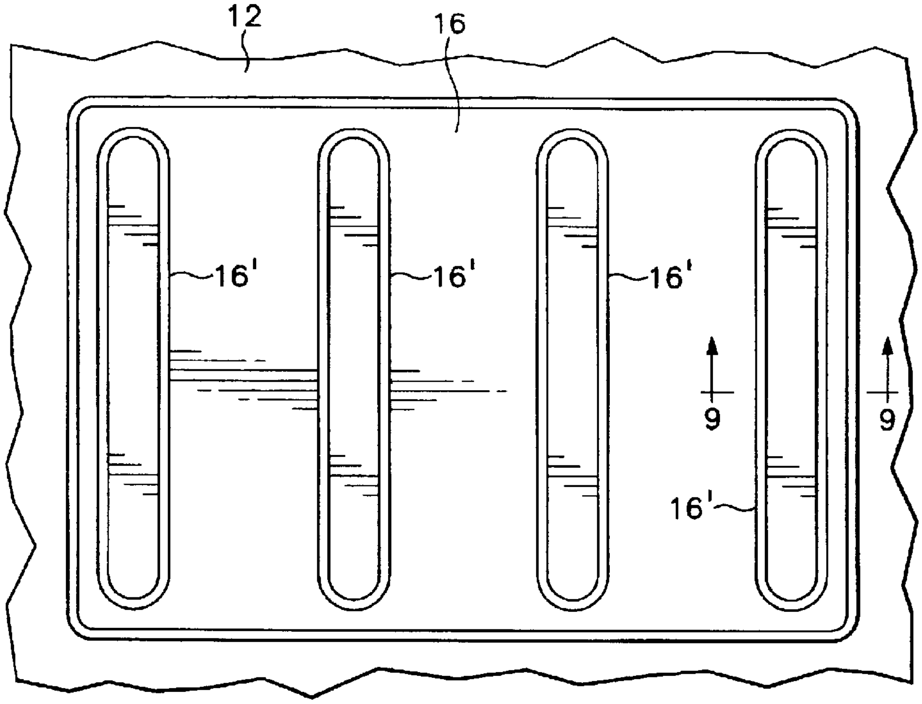
FIG. 8 is a schematic plan view of a second embodiment of the system of this invention utilizing a marker grid pattern formed as a molded sheet of plastic or other suitable material having, for purposes of illustration, three spaced apart raised marker bars formed in its upper surface.
Figure 9:
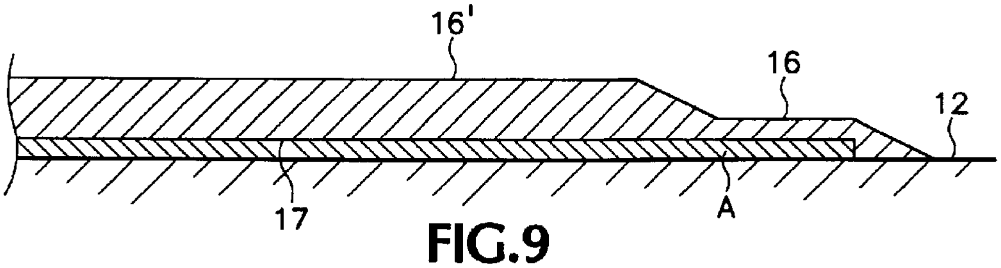
FIG. 9 is a fragmentary sectional view taken along the line 9—9 in FIG. 8.

Also if desired, the grid patterns may be formed as raised, laterally spaced apart, substantially parallel, longitudinally elongated marker portions 16' in the surface of a sheet or pad 16 of material, as by the molding of synthetic resin into the pad constructions such as the one shown in FIG. 8, for securement of the sheet or pad to a sidewalk or other underlying support in appropriate orientation. A recessed pocket 17 may be provided as shown in FIG. 9 for receiving a volume of mounting adhesive A, as described in connection with the marker members of the first embodiment. As will be recognized by those skilled in the art, this embodiment of the system of this invention requires that different pad constructions be individually provided with selected numbers of marker members preformed thereon in order to provide the various grid patterns (G1–G4) designating the various corresponding situations and obstacles that may be encountered. While this embodiment of the invention may be more expensive to produce, it may in fact be preferred for use in certain areas such as on private properties and indoors in commercial buildings and such where installation of a single pad member may be preferred.

Having thus described the basic marker member arrangement of this invention, reference is again made to its use in various number combinations to form and provide various different grid patterns of the guidance system of this invention that provides warning of, guidance relative to, and specific identification of the particular type of situation or hazard being encountered by a visually impaired pedestrian. With reference to the various different grid patterns G1, G2, G3, and G4 illustrated in FIGS. 1 and 4–6 respectively, it can readily be seen that four distinct marker grids are provided by simply utilizing different numbers of parallel marker members 10 in different, spaced apart patterns. In the embodiments illustrated, the marker members in each grid pattern are shown to be regularly or evenly spaced apart laterally from each other, but it is to be understood that additional patterns can also be formed by providing intermediate and other marker members in irregularly-spaced apart positions between outermost marker members, as for example a single intermediate member spaced closer to one or the other outer members, etc. For purposes of illustration as shown in FIG. 7 of the drawings, the grid G1 is used herein to designate and identify crosswalks on streets and at intersections; grid G2 is provided to designate and identify stairs, escalators and other similar obstacles; grid G3 is provided to designate and identify transit loading areas such as bus, light rail and taxi cab stops and boarding points, train, subway and other mass transit loading areas, etc.; and grid G4 is provided to identify and designate doorways and building entrances and exits, etc. These are all illustrated schematically in the drawing. Other grids having other groups and numbers of spaced marker members may also be provided as alternatives or for providing patterns designating additional obstacles.

It will be recognized by those skilled in the art that immediately upon contact of a grid pattern marker member by the working tip end of a visually impaired pedestrian's cane, that pedestrian is immediately warned that he has encountered a designated situation. During the sweep of the cane over the grid marker, the pedestrian becomes aware, by the feel of the cane as it sweeps over the marker members 10 and the spaces between them, of the number of elongated marker members forming the particular grid he has encountered and therefore recognizes the particular type of situation that has been encountered. Finally, as will also be apparent, by using his or her cane, the pedestrian may immediately align himself along the longitudinal line of the longitudinally extending marker members and thus be properly oriented on that line-of-travel for continued travel relative to the situation encountered. Clearly therefore, it is important that during installation of the grid on the underlying support surface, the grid pattern be carefully oriented so that the elongated dimension of the mounted marker members are effectively and accurately pointing as precisely as possible in the direction of travel required. This of course is especially important at crosswalks where the destination on the opposite side of the street is distant and therefore accurate directioning is critical.

Figure 10:
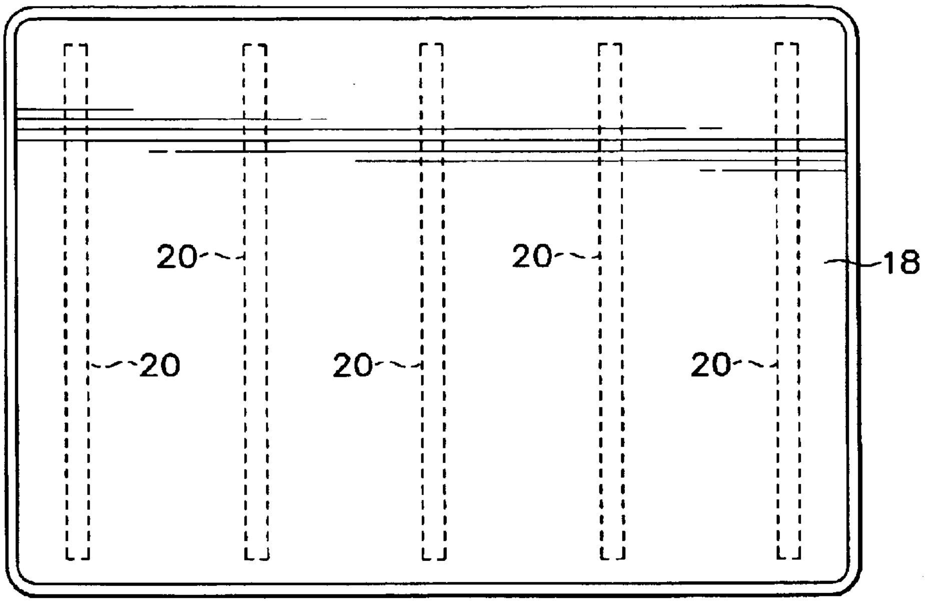
FIG. 10 is a schematic plan view of a third embodiment of the system of this invention utilizing a marker grid pattern comprising a molded sheet of selected material arranged for application onto an underlying ground surface, the sheet of material incorporating a plurality, five illustrated herein, of embedded magnetic strips providing the elongated marker members of this invention for detection by a magnetically-attracted tip of a cane passed thereover.

FIG. 10 illustrates another embodiment of this invention utilizing a sheet or pad of material 18 provided for securement by adhesive or other suitable mounting means to an underlying support surface, the pad of material incorporating a selected plurality of longitudinally extending, laterally spaced apart metal or magnetic strips 20 embedded within its interior, as indicated by the broken line strips shown in FIG. 10. Those skilled in the art will recognize that a blind or otherwise visually impaired pedestrian's cane having a corresponding magnetic or metal tip end will, when passed over the pad 18, react in magnetically attracting manner to the magnetic strips embedded in the pad of material giving an easily detectable count of the number of longitudinally extending strips which the pedestrian can sense as his cane passes laterally across the surface of the pad. As described before, the particular number of longitudinally extending strips designates the particular type of obstacle encountered and the longitudinal extension of the magnetic strip identifies the line of travel which the pedestrian detects with the cane tip and orients himself on for proper continued travel relative to the obstacle.

Figure 11:
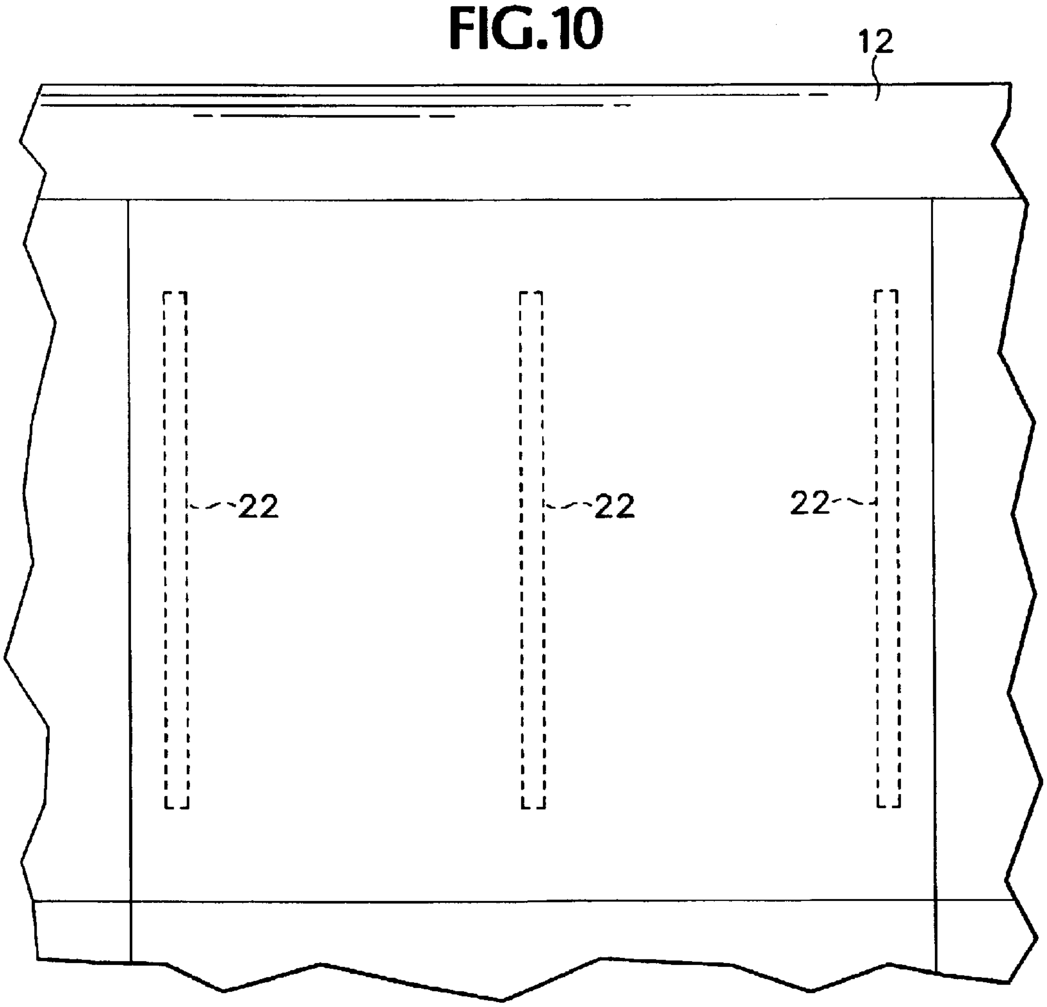
FIG. 11 is a fragmentary plan view of a fourth embodiment of the system of this invention in which a portion of an underlying walk support incorporates embedded magnetic strips, three being illustrated herein, defining a grid pattern designating a particular one of a plurality of different obstacles to a visually impaired pedestrian using a cane having a magnetic or magnetically attracted tip end responsive to the embedded marker strips when passed across the surface of the concrete area.

FIG. 11 provides yet another embodiment of the system of this invention quite similar in concept to the embodiment of FIG. 10 previously described, but shows the embedding of the plurality of metal or magnetic strips 22 directly into the underlying walk support 12. In this regard, the magnetic strips may be embedded into the concrete material of a sidewalk support when it is poured in the case of new sidewalk construction, or alternatively in the case of established sidewalks and underlying supports, a plurality of longitudinally extending cuts can be made into the surface of the underlying support as with a circular saw, and then placing the strip material into the grooves formed and then filling the grooves with an appropriate mastic or filler material, as is known in the art.

From the foregoing it should be clear that the guidance system of this invention provides the three-fold function of warning of a potentially hazardous situation; providing orientation and way-finding for a visually-impaired pedestrian's travels; and identifying the specific type of situation being encountered by the visually-impaired pedestrian. Moreover, and just as importantly as the aforementioned functions, it provides the visually-impaired pedestrian, is that the guidance system of this invention may do so by utilizing only a single, extremely simple and economical marker member to manufacture and produce. Moreover, since the various grids are provided by directly securing individual marker members to the underlying ground surface in spaced apart condition as described, the installation of the grids is extremely simple and labor-efficient, and installation may be effected without any modification required of the actual underlying support surface. Further, since the spaces between the raised marker members comprise the actual, original underlying support surface itself, installation of the grids does not and cannot restrict the existing water drainage characteristics of the surface, and therefore the grids of this invention comply with regulations and codes governing such factors.

However, it will also be understood that irrespective of the particular form of grid construction or the manner in which the various grids of the guidance system of this invention may be provided on an underlying walkway surface, the fundamental import of the present invention is the provision of a plurality of grids which have a common, predetermined overall longitudinal dimension and may have a common, predetermined overall lateral dimension, the grids formed of a plurality of substantially identical, laterally spaced apart marker members oriented so that the longitudinal dimension of the marker members provide directional instruction, and the particular number of spaced marker members in a grid identifies the particular type of obstacle, wherein a grid having a pattern formed of a group of two laterally spaced apart marker members designates a first type of situation to a visually impaired pedestrian; a grid having a pattern formed of a group of three laterally spaced apart marker members designates a second type of situation; a grid having a pattern formed of a group of four laterally spaced apart marker members designates a third type of situation; a grid having a pattern formed of a group of five marker members spaced laterally apart designates a fourth type of situation being encountered, and so on.

It will therefore be apparent to those skilled in the art that various changes other than those previously discussed may be made in the size, shape, type, number and arrangement of parts described hereinbefore. For example, a passive electronic device may be incorporated in a base support and a sensor mounted on the cane tip to provide an audible signal to a visually impaired person. A single marker member may be used to signal the need to stop short of an obstacle, or one or more marker members may be disposed perpendicularly relative to the plurality of laterally spaced apart, longitudinally extending marker members in a pattern to designate certain other types of generally related obstacles. For example, a perpendicular member in a grid pattern designating stairs may designate the entrance to an escalator or moving walkway and the particular positioning of the perpendicular member relative to the grid pattern may further identify the up or down travel of the escalator. Another example might be the addition of a perpendicular member to a grid pattern designating a doorway entrance to identify the doorway entrance to an elevator. These and other modifications may be made, as desired, without departing from the spirit of this invention and the scope of the appended claims.

Having thus described my invention and the manner in which it may be used,

I claim:

1. A tactile identification and direction guidance system for visually impaired users of walking guide canes the guidance system comprising a plurality of substantially identical, longitudinally elongated, tactile marking means for forming a plurality of different predetermined patterns of different predetermined numbers of said substantially identical, elongated tactile marking means, each said different predetermined pattern identifying and designating, by the number of said marking means forming the pattern, a corresponding predetermined, different type of obstacle encountered by said person and for identifying, by the longitudinal direction of extension of said longitudinally elongated marking means forming the pattern, the longitudinal direction of subsequent movement required of said person relative to said obstacle, for disposition of only a selected, one, single designated pattern on an underlying walking surface immediately adjacent an entry of a corresponding, designated type of obstacle for detecting by cane the particular number of said substantially identical, elongated marking means forming the particular pattern to identify the corresponding, particular type of different, designated obstacle encountered, and for identifying by cane the longitudinally elongated direction of extension of said substantially identical longitudinally elongated marking means forming the pattern for orienting the cane and its operator along said longitudinal direction of said longitudinally elongated marking means for subsequent movement required of the person relative to the entry and navigation of said obstacle in said longitudinally elongated direction of the marking means forming the selected pattern, and wherein all areas of the underlying walking surface surrounding and extending from a said one single selected pattern disposed thereon immediately adjacent the entry of a corresponding obstacle is entirely unaffected and unaltered by said guidance system.

2. The system of claim 1 wherein each tactile marking means is a tactile marking member capable of being supported on an underlying support.

3. The system of claim 2 wherein each tactile marking member defines a raised contour on an underlying walking support surface, the raised contour having a height of about one-fourth inch.

4. The system of claim 2 wherein each of said plurality of different predetermined patterns includes a different predetermined number of said tactile marking members in laterally spaced, substantially parallel extending condition for identifying, by the number of said marking members forming a pattern, a specific type of obstacle and for orienting, along the longitudinal direction of extension of said marking members forming a pattern disposed on an underlying walking support surface immediately adjacent an entry of an obstacle, the cane and person for subsequent movement required of said person relative to the entry and navigation of said obstacle.

5. The system of claim 2 wherein each tactile marking member has an adhesive bottom side and a peripheral outwardly tapered edge.

6. The system of claim 1 wherein each of said patterns includes a predetermined number of elongated tactile marking members arranged in laterally spaced apart, substantially parallel position for detecting by a cane of a visually impaired person the number of spaced apart members to identify the associated type of obstacle and for detecting by cane the longitudinal direction of the elongated members to identify the direction of, and orient the cane and person for, subsequent movement required of said person relative to said obstacle.

7. A method of providing a tactile identification and directional guidance system for detection by a walking guide cane operated by a visually impaired person, the method comprising providing on an underlying walking support immediately adjacent an entry of a designated obstacle to be navigated by a visually impaired person a single, selected one of a plurality of predetermined groups of different numbers of substantially identical, longitudinally elongated tactile marking members configured for detection by a cane of said person, the number of said marking members forming the selected group to identify the associated designated type of obstacle and the longitudinal direction of the elongated members oriented for movement of the cane therealong to identify the direction of, and orient the cane and person for, subsequent longitudinally-oriented movement required of said person relative to the entry to and navigation of said obstacle.

8. The method of claim including transpose 7 supporting on an underlying walking surface a predetermined number of substantially identical, longitudinally elongated tactile marking members arranged in laterally spaced apart, longitudinally extending condition to identify by the number of spaced apart marking members a specific type of obstacle and to identify, by the longitudinal orientation of the laterally spaced apart members, the direction of movement required of a visually impaired person relative said obstacle.

9. The method of claim 8 including utilizing a template to orient the predetermined number of tactile marking members for support on an underlying walking surface.

10. The method of claim 8 including forming the predetermined number of tactile marking members on a sheet of material in a pattern predetermined to identify the type of obstacle and the direction of movement required of a visually impaired person.

* * * * *

UNITED STATES PATENT AND TRADEMARK OFFICE

CERTIFICATE OF CORRECTION

PATENT NO. : 6,964,244 B2
DATED : November 15, 2005
INVENTOR(S) : Kevin M. Stockton It is certified that error appears in the above-identified patent and that said Letters Patent is hereby corrected as shown below:

Column 10,
Line 31, "The method of claim including transpose 7 supporting…" should read:
-- The method of claim 7 including supporting… --.

Signed and Sealed this

Seventh Day of March, 2006

JON W. DUDAS
*Director of the United States Patent and Trademark Office*